(12) United States Patent
Hejplik et al.

(10) Patent No.: US 11,084,082 B2
(45) Date of Patent: Aug. 10, 2021

(54) RADIAL PRESS

(71) Applicant: Uniflex-Hydraulik GmbH, Karben (DE)

(72) Inventors: Vaclav Hejplik, Dietzenbach (DE); Carsten Baumgartner, Laubach (DE); Lukas Zientek, Wölfersheim (DE)

(73) Assignee: UNIFLEX-HYDRAULIK GMBH, Karben (DE)

( * ) Notice: Subject to any disclaimer, the term of this patent is extended or adjusted under 35 U.S.C. 154(b) by 149 days.

(21) Appl. No.: 16/059,414

(22) Filed: Aug. 9, 2018

(65) Prior Publication Data

US 2018/0361459 A1    Dec. 20, 2018

Related U.S. Application Data

(63) Continuation of application No. PCT/EP2017/051360, filed on Jan. 24, 2017.

(30) Foreign Application Priority Data

Feb. 10, 2016 (DE) ..................... 10 2016 102 275.6

(51) Int. Cl.
*B21D 39/04* (2006.01)
*B30B 7/04* (2006.01)
*B30B 15/04* (2006.01)

(52) U.S. Cl.
CPC .............. *B21D 39/048* (2013.01); *B30B 7/04* (2013.01); *B30B 15/042* (2013.01)

(58) Field of Classification Search
CPC ..... B30B 15/042; B30B 15/044; B21D 37/01; B21D 37/00; B21B 39/048
See application file for complete search history.

(56) References Cited

U.S. PATENT DOCUMENTS 3,717,024 A * 2/1973 Davison .................. B30B 15/04
                                                                72/455
4,250,735 A * 2/1981 Spedding ................. B21J 13/04
                                                               100/214
(Continued)

FOREIGN PATENT DOCUMENTS

DE      2844475 A1     10/1978
DE      3331721 A1      9/1983
(Continued)

OTHER PUBLICATIONS

International Search Report for corresponding International Patent Application No. PCT/EP2017/051360 dated May 24, 2018.

(Continued)

*Primary Examiner* — Adam J Eiseman
*Assistant Examiner* — Dylan Schommer
(74) *Attorney, Agent, or Firm* — Myers Wolin, LLC (57) ABSTRACT

A radial press is provided having a main structure, a plurality of pressing jaws arranged around a pressing axis, and having a drive unit which acts on the pressing jaws. The drive unit is supported on the main structure and can move the pressing jaws radially in the direction of the pressing axis and away from the same, at least one fibrous structure is provided radially outside the pressing jaws, the fibrous structure enclosing the pressing jaws and extending in annularly closed form around the pressing axis in a plane which is substantially perpendicular to the pressing axis.

3 Claims, 10 Drawing Sheets

(56) References Cited

U.S. PATENT DOCUMENTS

| | | | | | |
|---|---|---|---|---|---|
| 4,306,442 | A | * | 12/1981 | Schröck | B21D 41/04 |
| | | | | | 29/237 |
| 4,578,982 | A | | 4/1986 | Schröck | |
| 4,766,808 | A | | 8/1988 | Schröck | |
| 5,323,697 | A | * | 6/1994 | Schrock | B21D 39/048 |
| | | | | | 100/232 |
| 7,150,177 | B2 | * | 12/2006 | Hellgren | B30B 5/02 |
| | | | | | 72/455 |
| 2006/0090529 | A1 | | 5/2006 | Katzfuss et al. | |

FOREIGN PATENT DOCUMENTS

| | | |
|---|---|---|
| DE | 3611253 A1 | 10/1987 |
| DE | 4135465 A1 | 4/1993 |
| DE | 19817882 A1 | 11/1999 |
| DE | 199112976 A1 | 9/2000 |
| DE | 10047025 A1 | 5/2002 |
| DE | 10149924 A1 | 4/2003 |
| EP | 1302255 B1 | 4/2003 |
| WO | 2007110736 A2 | 10/2007 |

OTHER PUBLICATIONS

Written Opinion issued for corresponding International Patent Application No. PCT/EP2017/051360, dated May 24, 2017.

* cited by examiner

RADIAL PRESS

CROSS REFERENCE TO RELATED APPLICATIONS

This application is a continuation under 35 U.S.C. § 120 of International Application PCT/EP2017/051360, filed Jan. 24, 2017, which claims priority to German Application No. 10 2016 102 275.6, filed Feb. 10, 2016, the contents of each of which are incorporated by reference herein.

FIELD OF THE INVENTION

The present invention relates to a radial press with a basic structure, a multiplicity of press jaws disposed around a press axis and a drive unit, which acts on these, is braced on the basic structure and by means of which the press jaws can be moved radially on the press axis toward and away from it.

BACKGROUND

Such radial presses are known in various designs and constructions, for example as so-called "yoke presses" (see, e.g., DE 4135465 A1, DE 19912976 A1 and DE 19817882 B4), "hollow-piston presses" (see, e.g., DE 10149924 A1) or in other designs (see, e.g., DE 2844475 A1, DE 3611253 A1, DE 10047025 C2 and DE 3331721 A1).

The scope of use of radial presses of the class in question here has steadily expanded further. Starting from the traditional use, namely the undetachable, permanently secure and sealed attachment of connecting fittings (by so-called crimping) to the ends of a tube portion during the manufacture of ready-to-install hydraulic lines, a large number of other uses has meanwhile become standard, up to the joining of large-bore pipes in pipeline construction.

SUMMARY

The present disclosure has adopted as an object the optimizing of radial presses of the type in the class in question here for the expanded range of use or of upgrading them for use in new fields.

The present stated object may achieved by providing, in a radial press of the type mentioned in the introduction, radially outside the press jaws, a fiber structure that extends in annularly closed form around the press axis in a plane oriented substantially perpendicular to the press axis. For this purpose, the present disclosure makes use of the knowledge that, by appropriate design, the forces, torques and loads occurring outside the press jaws in radial presses of the type in question here can be converted even completely or at least almost completely into tensile stresses that act in a structure surrounding the press jaws or can be absorbed or compensated by such. Such tensile stresses can in turn be dissipated or controlled particularly efficiently—with respect to the weight, volume, strength, expansion behavior, temperature variation, etc. of the load-absorbing structure—by the annularly closed fiber structure provided according to the disclosure and extending around the press axis.

Fiber structures in such a sense are to be considered as such structures in which long fibers extend in a manner oriented in circumferential direction around the press axis, especially by being manufactured (completely or at least partly) by a winding technique. These long fibers may be in particular such fibers having lengths equal to a multiple of the mean circumference of the annular fiber structure, so that a correspondingly large, i.e. multiple wrapping is obtained. In particular, the manufacture of the fiber structure by a winding technique using an endless filament can be regarded as particularly advantageous in this context. Thus the individual fiber structures or parts of fiber structures may be fabricated in single individual manner, especially even directly on the part carrying them during intended use, i.e. in situ. In the economic respect, however, the manufacture of relatively long tubular fabrics (especially taking place by the said winding technique) may also be attractive, wherein the individual parts of the fiber structure are then cut appropriately to the needed width.

For implementation of the described press, it is important that—during pressing of the workpiece—the fiber structure is subjected consistently to tension over its entire layout. To this extent, a further important viewpoint is that the fiber structure does not have any radii that are too small in circumferential direction and, even more so, no kink, corner or edge. To the contrary, the outer radius of the fiber structure in circumferential direction should not be smaller at any point than 1.5 times the value of the radius of the press die in its maximum opened position. Preferably, the outer radius of the fiber structure in circumferential direction is not smaller at any point even than 2 times the radius of the press die in its maximum opened position. But even when—due to geometric conditions and/or special load situations inside the fiber structure—locally pronounced stress peaks exist, the fiber layout (see above) suppresses the occurrence or the propagation of a crack and thus failure of the part.

Due to the particularly high strength of fiber structures, such as carbon in particular but also other nonmetallic fiber structures (e.g. glass fiber), powerful and nevertheless eminently compact radial presses can be created. Such compactness is an important viewpoint with respect to a broad spectrum of use; after all, space-consuming radial presses are problematic for the processing of diverse workpiece geometries, such as, for example, the case of tight bends.

According to a first preferred embodiment, several fiber structures disposed in a manner offset from one another in the direction of the press axis and independent of one another are provided. In this way, the favorable properties of the material used for manufacture of the annular fiber structure(s) can be additionally utilized for optimization of the dimensional stability and other quality of fabrication of the workpiece; after all, by the fact that several annularly closed fiber structures—disposed in a manner offset from one another in the direction of the press axis—are provided, the risk is greatly reduced that, if the workpiece becomes displaced in one direction or another along the press axis to a position deviating from the ideal position, the radial press will become so deformed in load-induced manner that more or less distinctly conical pressing will occur.

In the constructive respect, a preferred embodiment is characterized in that the at least one fiber-structure is part of a closed basic structure, wherein it bears circumferentially on a core structure. Accordingly, in this implementation, a basic structure manufactured in composite design is provided, wherein the fiber structure forms only one part, because of the fact that a core structure is further provided. In this connection, the statement that the at least one fiber structure bears circumferentially on the core structure is not to be understood to the effect that contact must exist continuously between the core structure and the at least one fiber structure over the entire circumference. To the contrary, it is also possible, for example, for the fiber structure to bridge with clearance over at least one gap existing between two core elements or core segments of the core structure (see hereinafter).

Thus the core structure may be constructed in particular as a bracing structure, which is provided with a multiplicity of recesses, in which the press jaws are guided in radially displaceable manner. In this improvement, therefore, precisely such a bracing structure is disposed inside the fiber structure. In yet another preferred improvement, these individually associated, single (e.g. hydraulic) drive elements act on the press jaws. Thus at least one drive element acts on each press jaw, and alone brings about the radial movement of this one press jaw in the associated recess of the bracing structure. Specifically, it is possible for this purpose to provide hydraulic drive elements, which are constructed as slave cylinders and are respectively pressurized by an associated master cylinder (of a supply unit). These master cylinders may be mechanically coupled with one another in such a way that they are all operated synchronously and in the process displace identical fluid volumes. For this purpose, it is possible in particular for a common main cylinder to act on all master cylinders, for example by the fact that the pistons of the master cylinders are mounted on a main piston. Depending on geometric conditions, it is then possible for pressure or force amplification to be achieved. From the viewpoints of overall size and of the least disruptive placement of the supply unit, it may then be particularly advantageous when the main cylinder is constructed as an annular cylinder with a direction of movement oriented parallel to the press axis. This annular cylinder may extend in particular around the press axis. In other installation situations, however, differently configured or disposed supply units are also favorable.

The bracing structure—surrounded or bordered by the fiber structure—explained in the foregoing may be constructed as one (at least substantially) structural unit. For diverse applications, however, a joined design will be advantageous, in which the bracing structure comprises a multiplicity of individual bracing segments joined together as a ring—which is provided with the receptacles for the press jaws.

According to another preferred improvement, the fiber structure is part of the drive unit. In this case, alternatively or in addition to integration of a fiber structure in the basic structure, a structural element or an assembly of the drive unit is surrounded radially outside the press jaws in an annularly closed form extending around the press axis by a fiber structure, which extends in a plane oriented substantially perpendicular to the press axis. In particular, for implementation of this variant, the radial press may be constructed as a compression-ring or hollow-piston press with a housing (forming the basic structure) and a compression ring or hollow piston that can be displaced therein parallel to the press axis, wherein the compression ring or hollow piston contains the provided fiber structure.

According to yet another embodiment of the radial press, the fiber structure is part of a basic structure, which is provided with at least two frame elements—disposed on sides, situated opposite one another, of a die installation space receiving the press jaws—and is open in the sense that the fiber structure represents the load-bearing joint between the two frame elements. This fiber structure is able to join the at least two frame elements with one another, especially in a manner bridging over at least one separating joint existing between these. For this improvement also, the special feature already explained hereinabove, that several fiber structures disposed in a manner offset from one another in the direction of the press axis are provided, is quite particularly advantageous. In this connection, it is particularly preferable for slippage to exist between the at least one fiber structure and the at least two frame elements, in the sense that the fiber structure can be displaced in load-dependent manner relative to the at least two frame elements. In this respect, the at least one fiber structure is particularly preferably disposed in an associated seat (or an associated guide, e.g. in the form of a guide groove), which permits slippage of the fiber structure in its circumferential direction but prevents displacement of the fiber structure transverse to the circumferential direction, i.e. especially in the direction of the press axis.

Particularly preferably, the drive device is provided with at least one drive element, constructed as a linear drive, which defines a working axis (extending transverse to the press axis), along which a further part of the drive device moved by the drive element can be displaced. The press jaws are mechanically coupled with this in the sense that any movement of that part is converted into a radial movement of the press jaws. The at least two frame elements, around which the at least one fiber structure extends and which are joined to one another by means of the at least one annularly closed fiber structure, are retained in their position relative to one another (in the direction of the working axis) by the tension acting in the fiber structure. In other words: The position of the at least two frame elements relative to one another (along the working axis) is determined in this case by the at least one fiber structure. This is preferably preloaded such that a predesignated minimum tensile stress is maintained even if the drive device is not actuated. In contrast, transverse to the working axis, the at least two frame elements are preferably positioned, adjusted and/or guided relative to one another via guide elements engaging with one another.

The constructive aspects explained in the foregoing may be applied with particular advantage, especially in radial presses constructed in yoke-press design or in radial presses having a design modeled on yoke presses. In these, two yokes (or yoke-like control members) are movable linearly relative to one another in a direction of movement oriented perpendicular to the press axis, wherein the press jaws are received in a die installation space formed between the two yokes/control members. One of the two yokes (or one of the two control members) may then represent an integral part with a frame element of the type explained in the foregoing. In contrast, a drive element, which is braced on the other frame element, associated with it, preferably acts on the other yoke (or on the other control member).

It is then of considerable advantage when the yokes/control members are braced on their rims facing away from the die installation space on two defined bracing zones spaced apart from one another on a respectively associated abutment. This counteracts "upward bending", under load, of the respective yoke/control member, which would sometimes be observed in the case of full-surface bracing of the yoke/control member, especially if the yokes/control members were too weakly dimensioned, and would disadvantageously influence the dimensional stability of the workpiece. In other words, with implementation of this improvement, the yoke/control member could be dimensioned somewhat more weakly than in the prior art, without having disadvantageous effects on the quality of pressing and of the finished workpiece. The abutment on which the respective yoke (or the respective control member) is braced in the region of each of the two bracing zones spaced apart from one another may then be an integrated part of the fiber structure, a separate frame element or a part of the drive element.

Merely for the sake of completeness, it is pointed out that, in the scope of the present invention, synchronous and matching movement of all (e.g. eight) press jaws will indeed be provided in the usual case but in no case is mandatory. To the contrary, by appropriate construction of the drive unit—for example the configuration of the control faces of the yokes, compression rings or other control members—it is possible for the press jaws to follow, in groups, different movement profiles, for example by the fact that some press jaws are delayed and/or slowed relative to the others and/or are moved by a shortened path. This may be useful for the manufacture of special geometries.

BRIEF DESCRIPTION OF THE DRAWING

The present invention will be explained in more detail hereinafter on the basis of various preferred exemplary embodiments illustrated in the drawing, wherein.

DETAILED DESCRIPTION OF THE PREFERRED EMBODIMENTS

Figure 1:
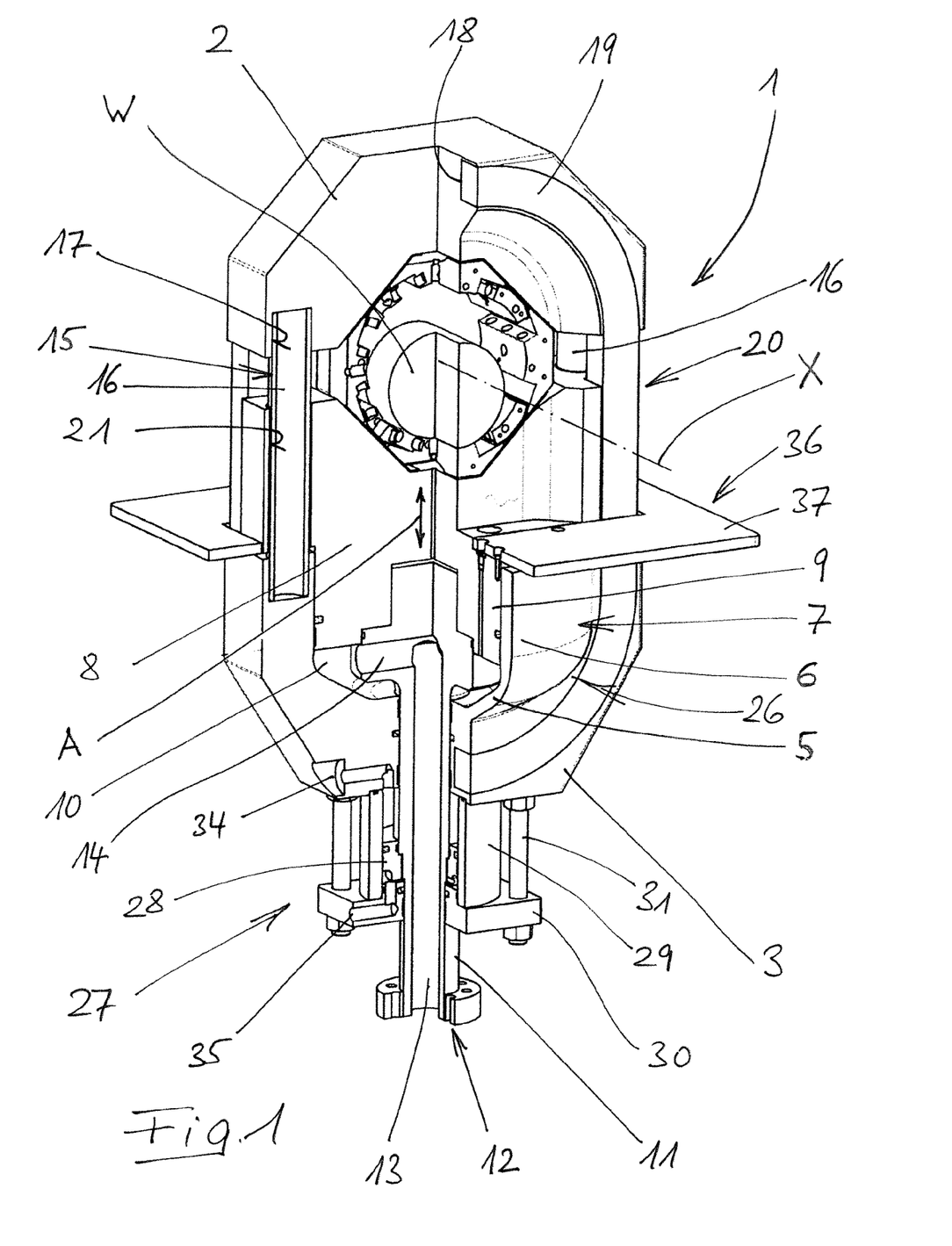
FIG. 1 shows a partly cutaway perspective view of a first exemplary embodiment of a radial press with opened die.
Figure 2:
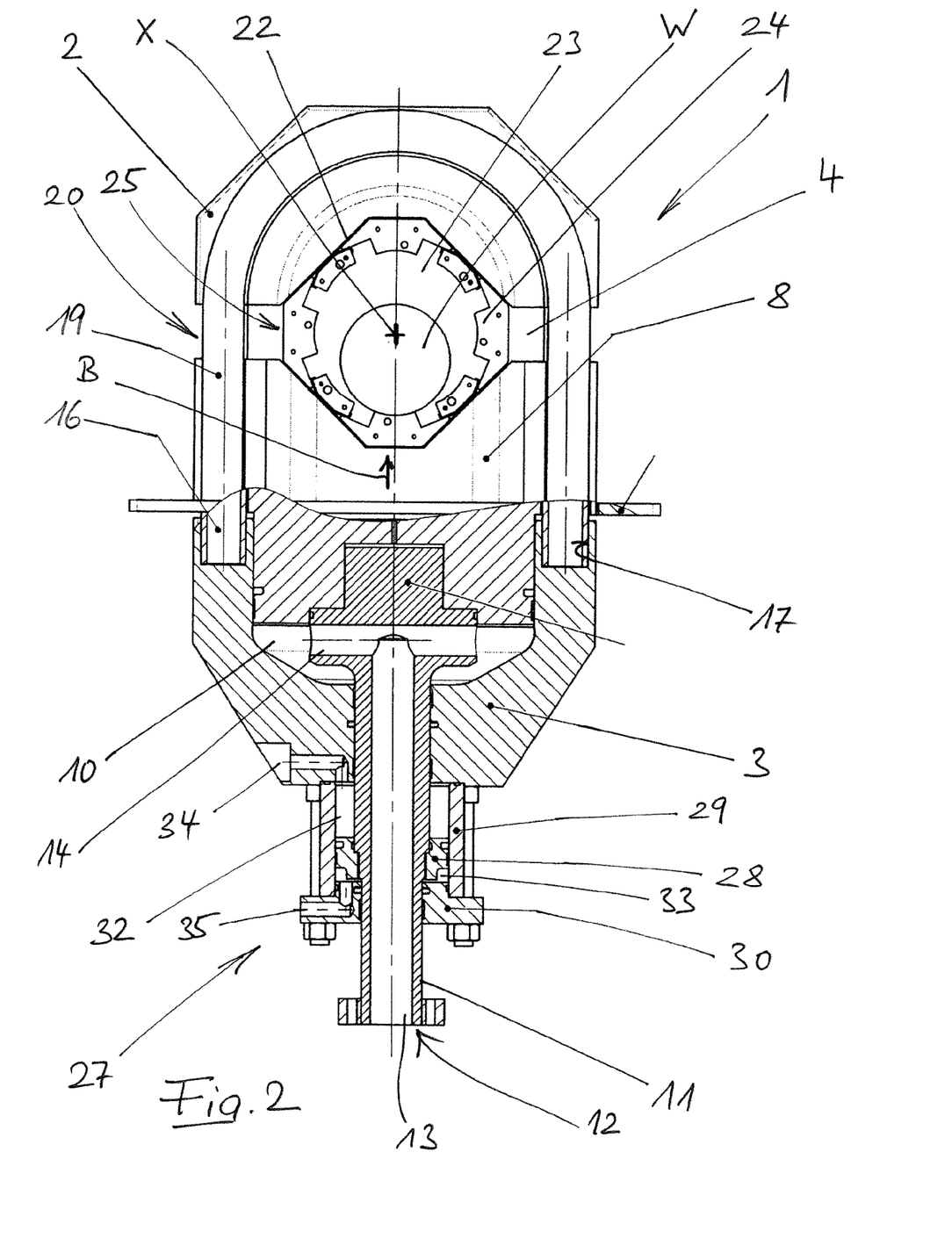
FIG. 2 shows a partly cutaway overhead view of the radial press according to FIG. 1.
Figure 3:
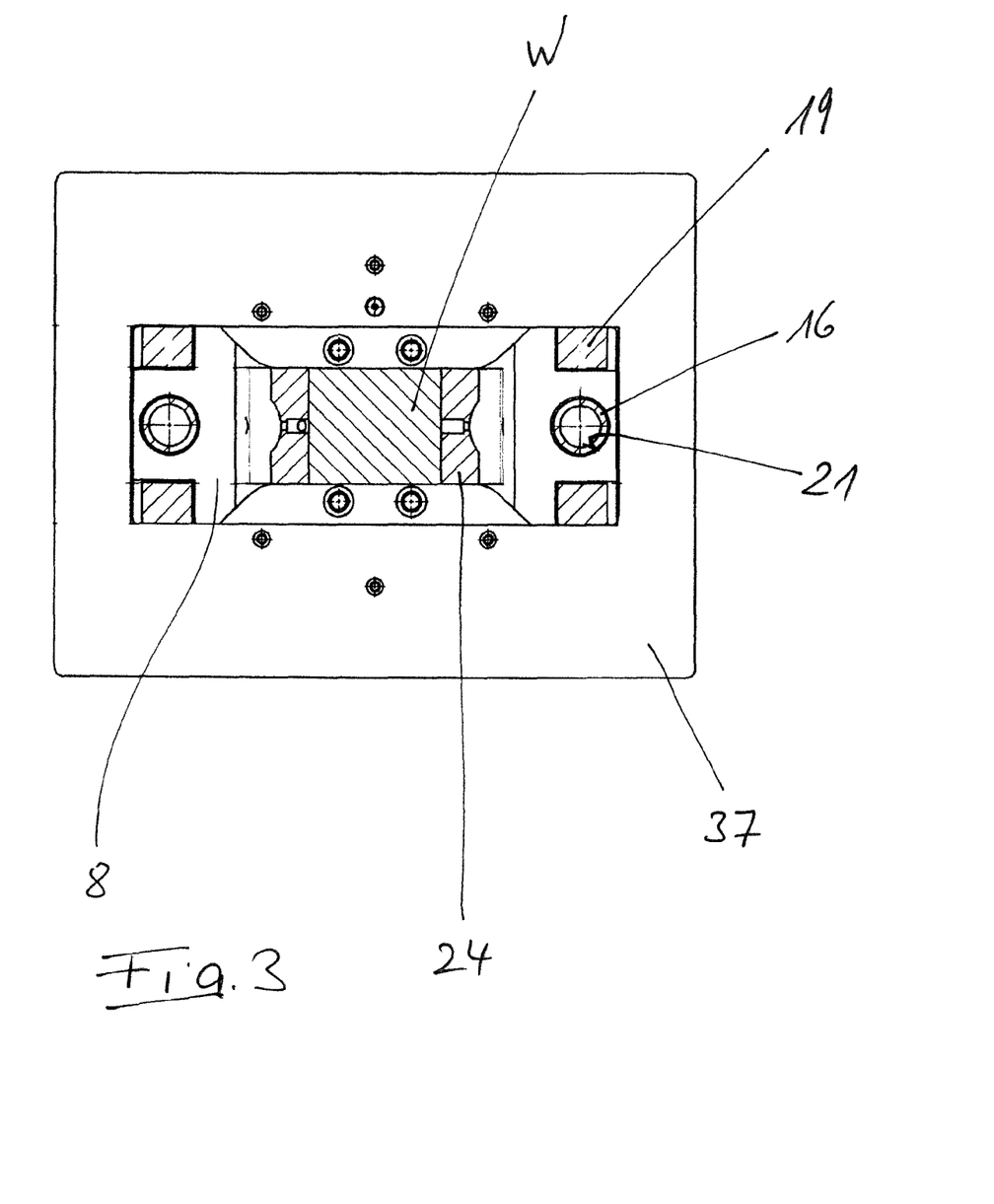
FIG. 3 shows a horizontal section through the radial press according to FIGS. 1 and 2 at the height of the press axis with closed die.

According to a first exemplary embodiment, the radial press shown in FIGS. 1 to 3 is used for radial deformation of a workpiece W relative to a press axis X. It comprises a basic structure 1 with an upper frame element 2 and a lower frame element 3. The two frame elements 2, 3 are parts which are separate from one another and between which a separating joint 4 exists. An upwardly open cylinder 7 comprising a bowl-shaped cylinder bottom 5 and a cylinder barrel 6 are integrated in lower frame element 3. Therein a piston 9 formed onto a slide 8 can be displaced sealingly along (vertical) working axis A. Cylinder 7 and piston 9 bound a hydraulic working chamber 10, which can be pressurized with hydraulic fluid via hydraulic port 12 disposed at the end of a hollow piston rod 11, bore 13 passing lengthwise through the piston rod 11 and transverse bore 14 (discharging into working chamber 10).

Upper frame element 2 and lower frame element 3 are adjusted and positioned relative to one another and thus held at a predesignated spacing from one another via guide elements 15, namely via two guide tubes 16—disposed in the central plane oriented perpendicular to press axis X—which engage in corresponding bores 17 of the two frame elements 2, 3. Each of the two frame elements 2, 3 is provided at its two end faces with respectively one groove 18, which describes a 180° arc and serves to receive a closed oval ring 19 of carbon fibers. The two carbon-fiber rings 19, which in the sense of the present embodiment respectively constitute a fiber structure 20 extending around press axis X in the plane oriented substantially perpendicular to press axis X, then bridge over, in annularly closed form, the separating joint 4 existing between the two frame elements 2, 3. These are placed under preload in the said grooves 18, so that the two frame elements 2, 3 maintain, at least substantially, their position relative to one another as predetermined by the two guide tubes 16, even under load (see hereinafter). A minimum expansion of carbon-fiber rings 19 occurring at particularly high press forces still does not have detrimental consequences, because slippage exists between carbon-fiber rings 19 and frame elements 2, 3, and so the tensile stresses can be distributed uniformly over carbon-fiber rings 19.

A die installation space 23, which is bounded by bracing and guide faces 22 and in which press die 25 comprising eight press jaws 24 is received, is formed between slide 8—guided by means of the two guide bores 21 on the two guide tubes 16—and upper frame element 2, in a manner known from yoke presses (see, for example, DE 4135465 A1). Since this corresponds, provided upper frame element 2 and slide 8 assume the function of the two yokes, to sufficiently known prior art, reference is made thereto; a more detailed explanation is not needed.

The movement (arrow B) of slide 8 along working axis A during pressing takes place by pressurization of hydraulic working chamber 10, already mentioned hereinabove. To this extent, cylinder 7 and piston 9 represent a drive element 26 by virtue of their cooperation. For a fast closing movement of slide 8 as well as opening of the radial press, an additional cylinder-piston group 27 is provided in the form of piston disk 28 which is joined to piston rod 11 and is guided sealingly in a cylindrical tube 29. This in turn is mounted on the lower closure face of lower frame element 3 and is fixed there by means of pressure plate 30 which together with bolts 31 is held tightly against lower frame element 3 and forms a cylinder bottom. In this way, an opening working chamber 32 as well as a fast-closing working chamber 33 is defined, wherein opening working chamber 32 can be pressurized via opening port 34 arranged in lower frame element 3, as can fast-closing working chamber 33 via fast-closing port 35 arranged in pressure plate 30.

FIGS. 1 to 3 further show working table 36 in the form of a plate 37 joined to slide 8, namely fixed on the upper end face of piston 9.

Figure 4:
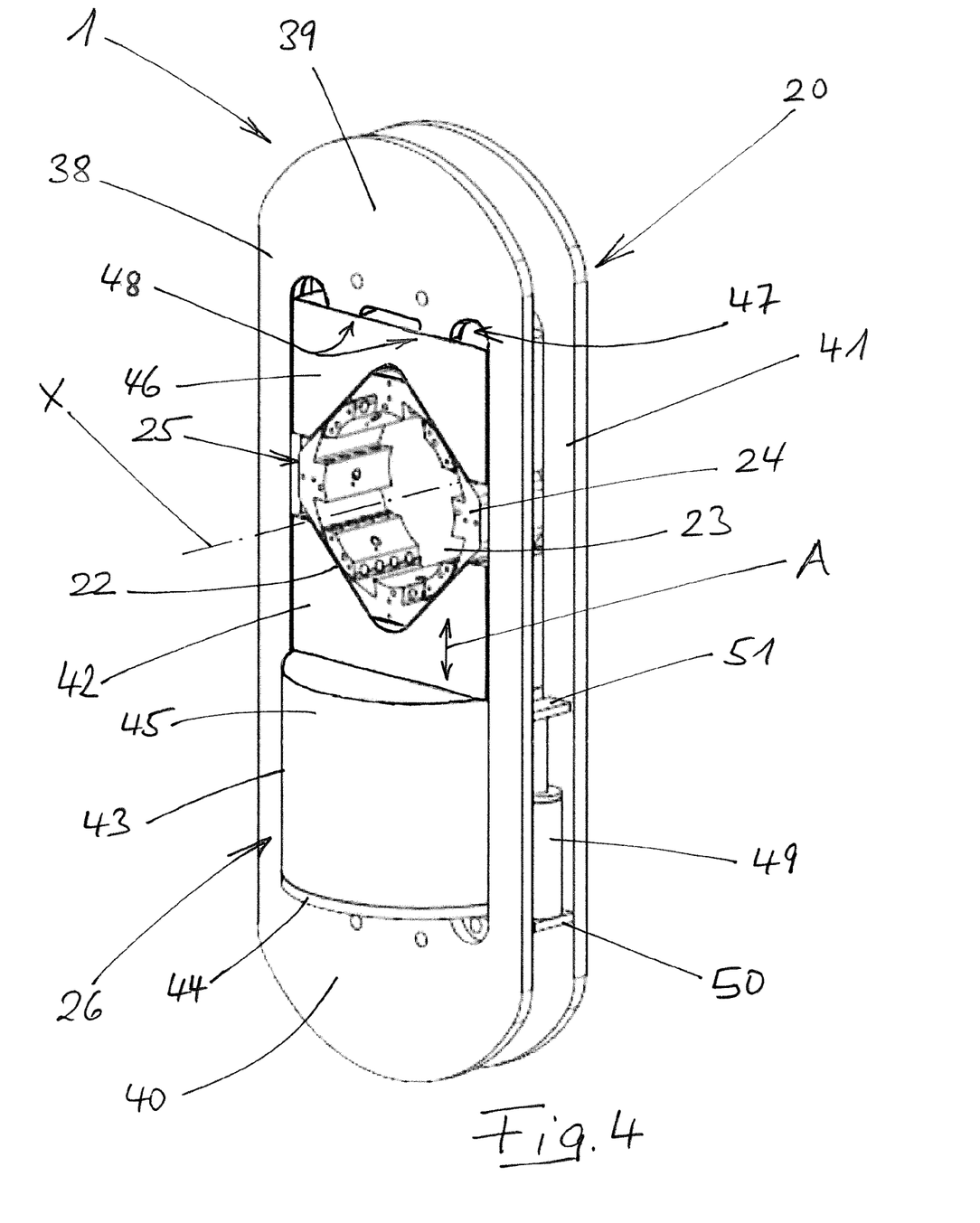
FIG. 4 shows a perspective view of a second exemplary embodiment of a radial press with opened die.
Figure 5:
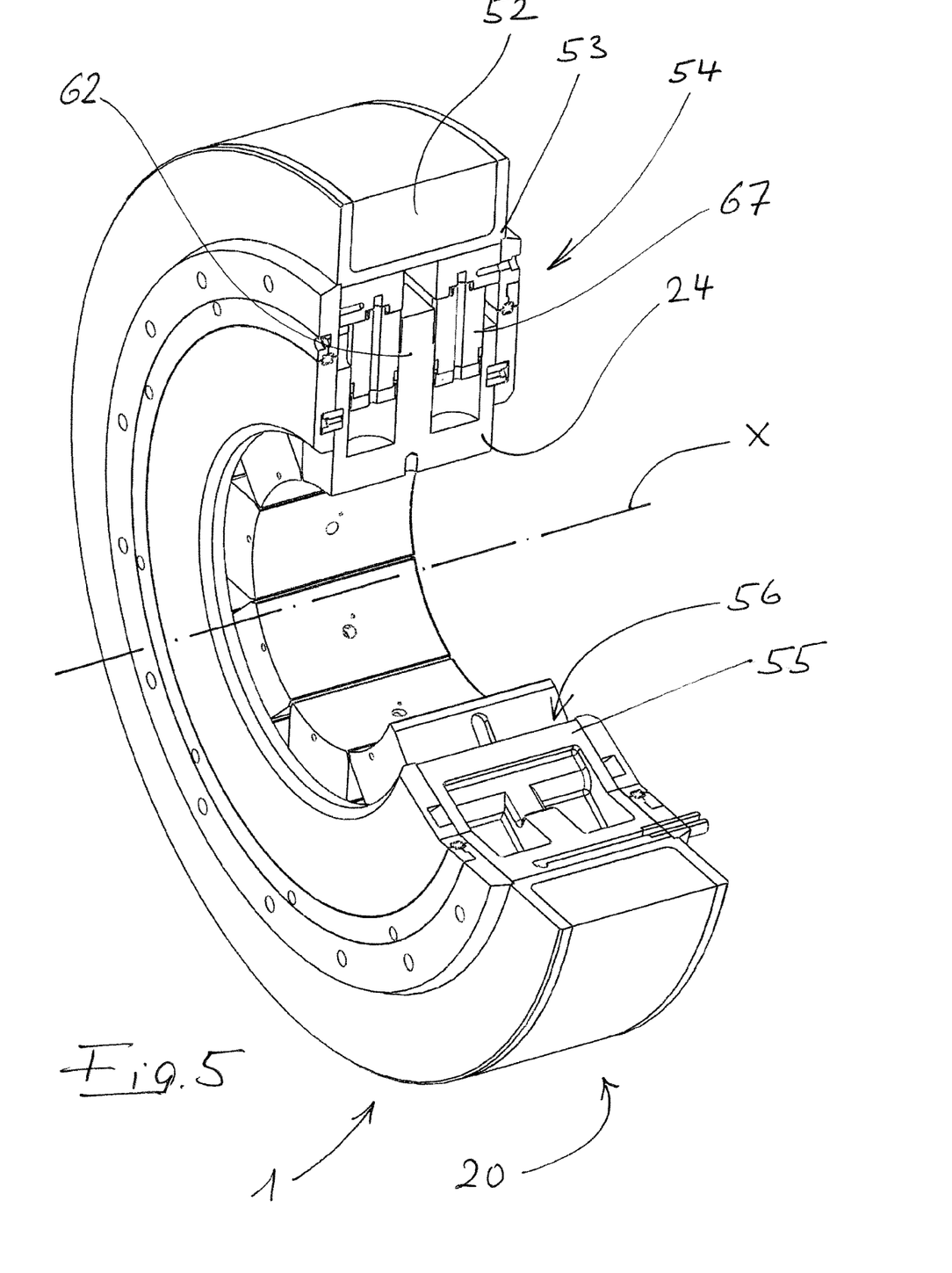
FIG. 5 shows a partly cutaway perspective view of a third exemplary embodiment of a radial press with closed die.
Figure 6:
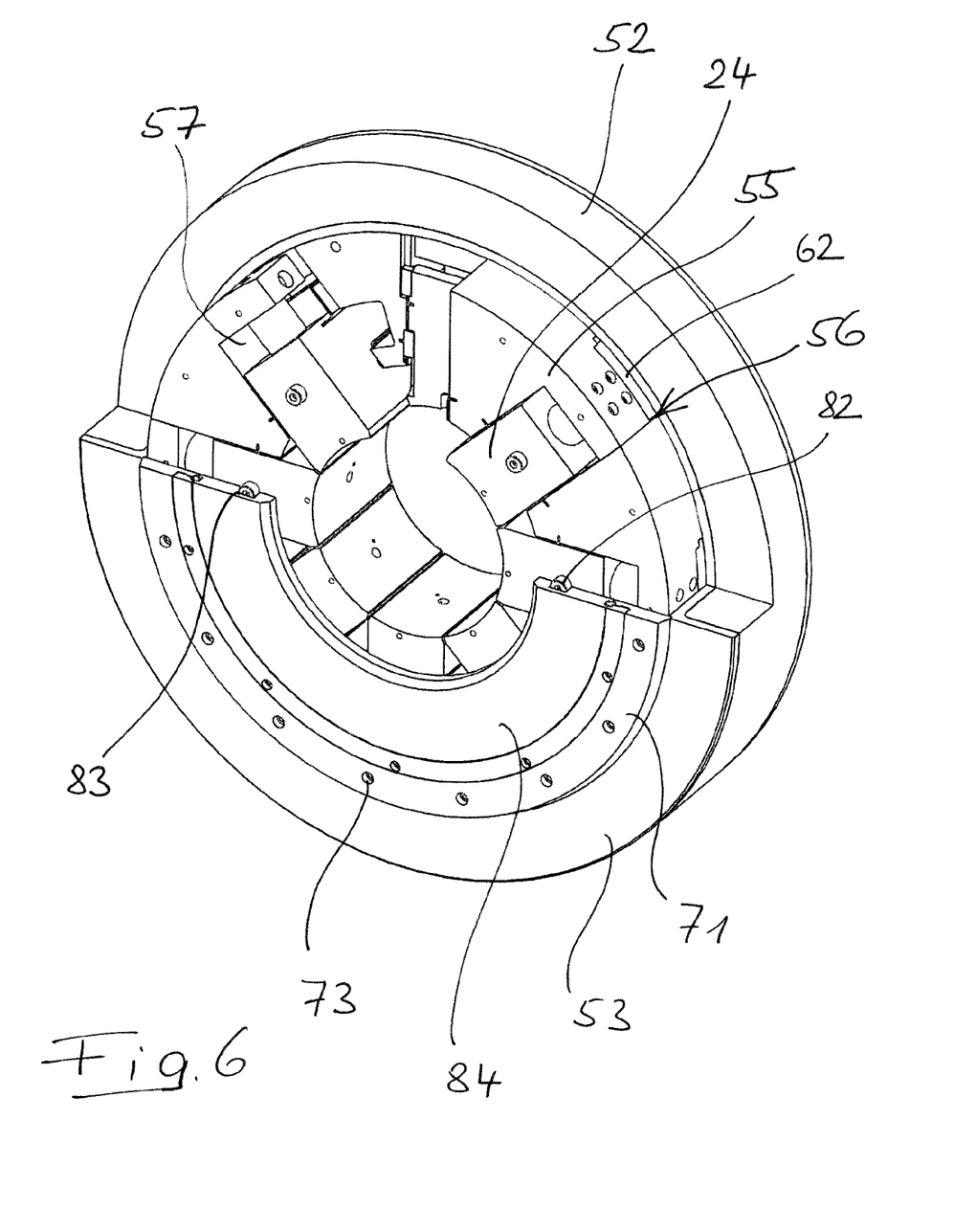
FIG. 6 shows the radial press according to FIG. 5 from another perspective, likewise cutaway.

According to a second exemplary embodiment, the radial press shown in FIG. 4 has considerable constructive parallels with the radial press according to FIGS. 1 to 3. To this extent, unless indicated otherwise in the explanations hereinafter, reference is made to the explanations about the radial press according to the first exemplary embodiment illustrated in FIGS. 1 to 3 for understanding of this exemplary embodiment.

One of the special features of the radial press according to FIG. 4 is that two annularly closed, contoured fiber composite elements 38 are provided as fiber structures 20 instead of "single" oval rings. Together, they are simultaneously the main basic structure 1 of the radial press and they respectively have a stiffened upper bracing region 39 and a stiffened lower bracing region 40 as well as two tension regions 41 extending parallel to the working axis; thus the two fiber composite elements 38 also partly take over the function assigned to the two frame elements 2, 3 in the radial press according to FIGS. 1 to 3. Drive element 26, functioning to displace the (yoke-like) lower control member 42 during pressing along working axis A, and constructed as a single cylinder-piston unit 43, is braced (via a foot plate 44 joined to the piston) on the lower bracing regions 40 of the two fiber composite elements 38, while lower control member 42 is joined securely with cylinder 45 of cylinder-piston unit 43. And upper control member 46 (likewise yoke-like) is braced on upper bracing regions 39 of the two fiber composite elements 38. It is obvious that the bracing of upper control member 46 on upper bracing regions 39 (which together form an abutment 47) of the two fiber composite elements 38 takes place respectively on two bracing zones 48 spaced apart from one another.

The two fiber composite elements 38 are held at the largest possible axial spacing from one another via spacer elements, not illustrated, i.e. at such a spacing that the outer end faces of fiber composite elements 38 and the outer end faces of the two control members 42, 46 are flush with one another.

For a fast closing movement of lower control member 42 as well as for opening of the radial press, two additional hydraulic cylinders 49 disposed laterally relative to cylinder-piston unit 43 are provided between the two fiber composite elements 38. These are respectively hinged at one end on a lower bracket 50 joined to foot plate 44 of cylinder-piston unit 43 and at the other end on an upper bracket 51 joined to cylinder 45 of cylinder-piston unit 43.

FIGS. 5 to 10 illustrate the implementation of a radial press according to a third exemplary embodiment. Here also, fiber structure 20, which surrounds press jaws 24 and radially outside press jaws 24 extends in annularly closed form around press axis X in a plane oriented perpendicular to press axis X, is a part of basic structure 1. For this purpose, a round, flat carbon fiber ring 52 is received in a carrier ring 53 in such a way that carbon fiber ring 52 is held radially inside as well as at both end faces. Carrier ring 53, bearing tightly on this, surrounds a core structure 54. Core structure 54 in turn has the configuration of a bracing structure 56, which is composed of eight identical bracing segments 55 joined annularly together and which is provided with eight recesses 57, in each of which an associated press jaw 24 is guided in radially displaceable manner. Each bracing structure 55 therefore has a base 58 (see FIGS. 7 and 8), which extends over an arc of approximately 45° and onto which—directed radially inward—a narrower guide wedge 59 (with a wedge angle of approximately 45°) is formed in such a way that, alongside it, a recess 57 functioning to receive a press jaw 24 remains, wherein this recess 57 is bounded in the assembled radial press by side face 60 of guide wedge 59 of neighboring bracing segment 55.

Figure 7:
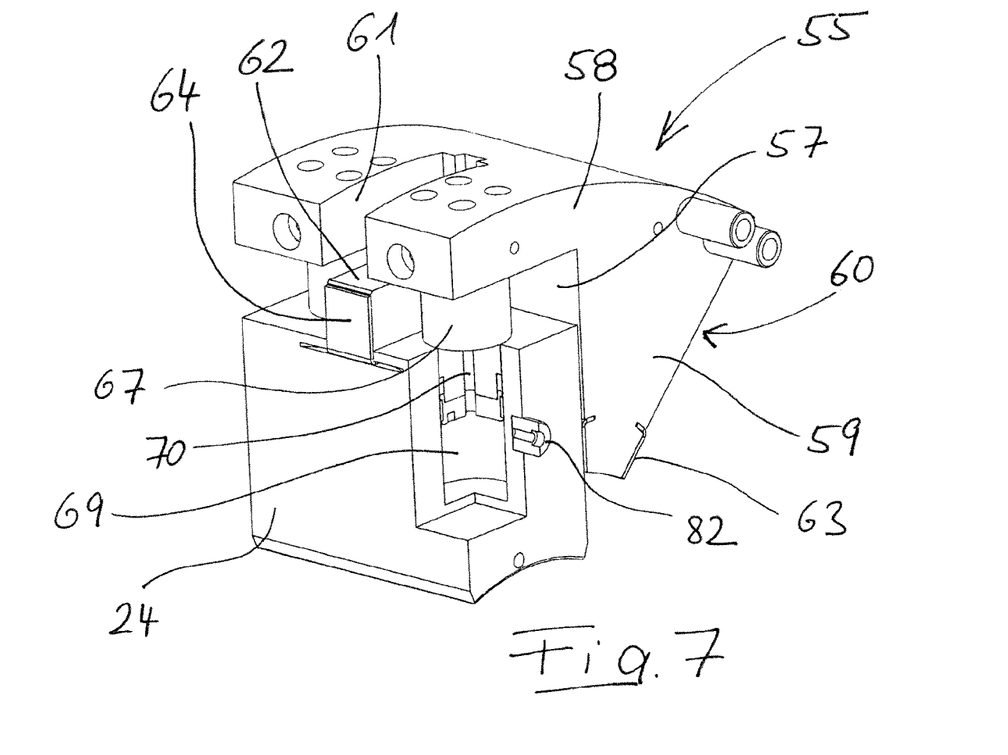
FIG. 7 shows an individual bracing segment of the radial press according to FIGS. 5 and 6 with associated press jaw in perspective view.
Figure 8:
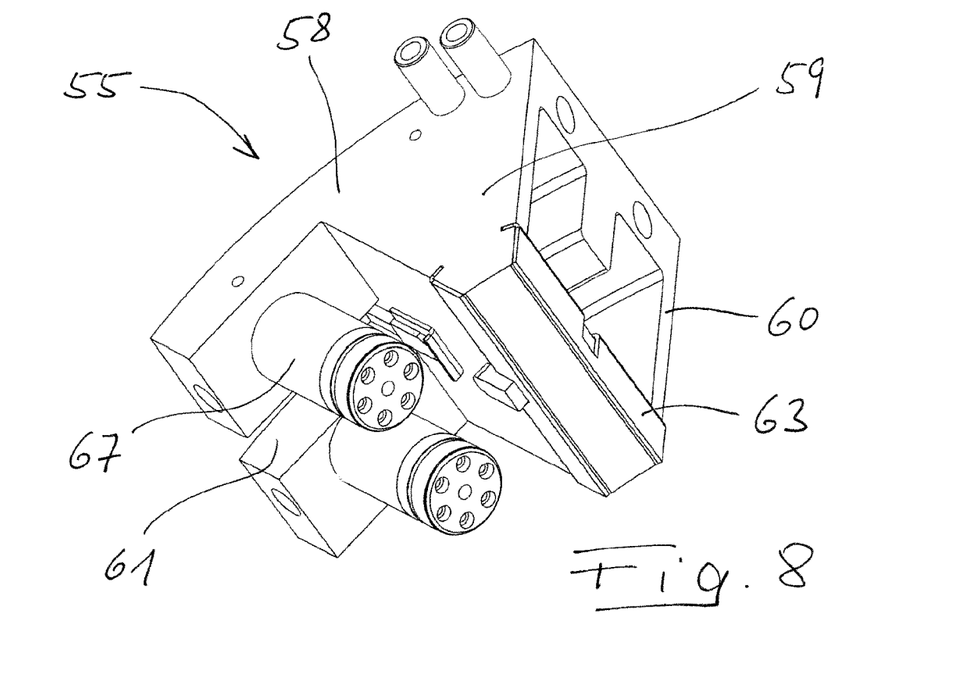
FIG. 8 shows the bracing segment according to FIG. 7 (without press jaw) from another perspective.

In the region of recess 57, base 58 of bracing segment 55 respectively has an opening 61, in which a guide projection 62 formed radially on the outside onto the associated press jaw 24 protrudes. In the interests of movability of press jaws 24 with low friction in the respectively associated recess 57, sliding plates 63 are disposed at the "tips" of guide wedges 59. Further sliding plate strips 64 are attached to press jaws 24 in the region of guide projections 62.

These individually associated hydraulic drive elements 26 act on the eight press jaws 24. For this purpose, each press jaw 24 is provided with two blind holes 65, which respectively form a working cylinder 66 (slave cylinder) and into each of which a working piston 67 fixed to base 58 of associated bracing segment 55 protrudes sealingly. Each working piston 67 is bored through axially in such a way that, at its free end face 68, which together with associated working cylinder 66 bounds a hydraulic working chamber 69, a fluid duct 70 emerges, which is in communication, via a line portion 72 routed through associated bracing segment 55 and one of the two bearing rings 71 at the end face, with a hydraulic port 73 disposed on the bearing ring 71 in question.

Figure 9:
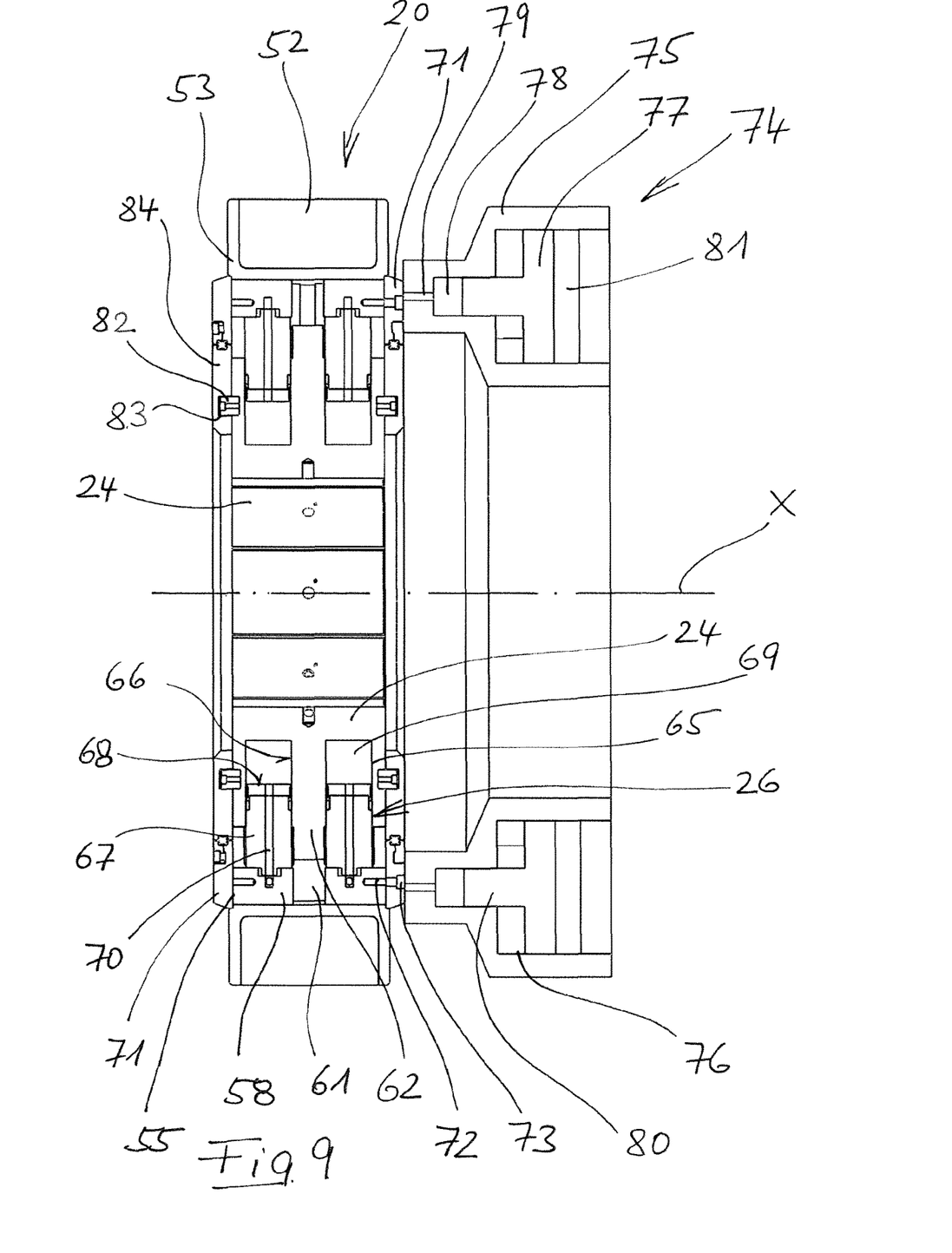
FIG. 9 shows the radial press according to FIGS. 5 to 8 together with built-on supply unit in an axial section (likewise with closed die)
Figure 10:
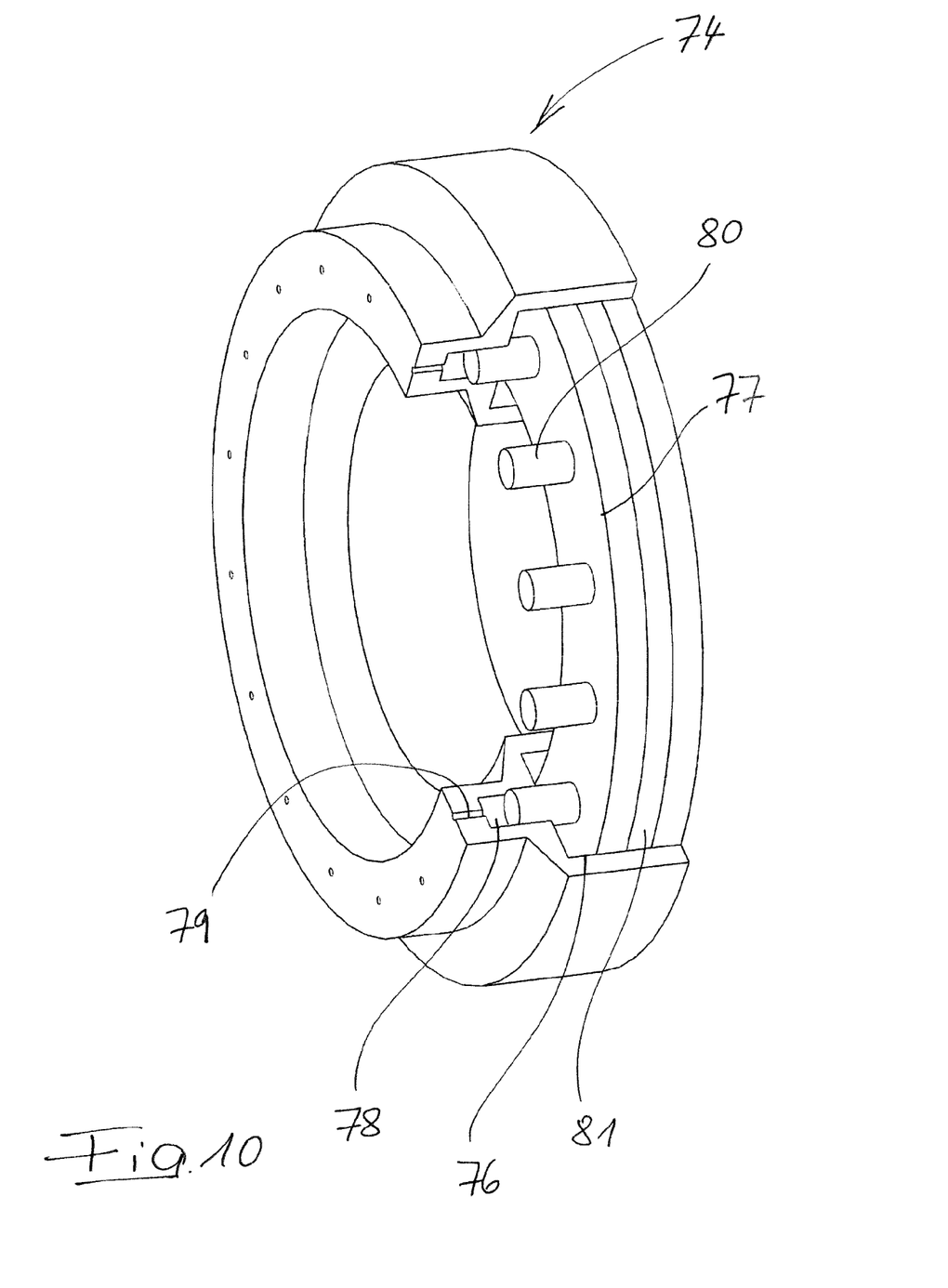
FIG. 10 shows the supply unit of the radial press according to FIG. 9 in partly cutaway perspective view

As an example, a supply unit 74, provided with an integrated hydraulic pressure booster as illustrated in FIGS. 9 and 10, is suitable for pressurization of working cylinder 66 (slave cylinder). This comprises an annular housing 75, which surrounds press axis X and has an annular cylinder 76, in which an annular piston 77 is guided displaceably parallel to press axis X. Sixteen master cylinders 78 (extending parallel to press axis X), which communicate with respectively one pressure outlet 79 (which can be placed in communication with a hydraulic port 73) are constructed in the annular housing. A master piston 80 is guided sealingly in each master cylinder 78, wherein the sixteen master pistons 80 are securely joined to annular piston 77. A low-pressure chamber 81 (which can be pressurized via main port, not shown) is situated on the opposite side of annular piston 77.

Two control pins 82 respectively project laterally, i.e. on both end faces of press jaws 24 in the direction of press axis X, from press jaws 24. These engage in respectively an associated control gate 83 of a control ring 84, which is mounted to rotate around press axis X on bearing ring 71, provided on the end face in question of the radial press. In this way, depending on construction of control gate 83, the press can be opened (by movement of press jaws 24 in radially outward direction) by turning the two control rings 84, and/or fast closing of press jaws 24 can be achieved by bringing them into contact on the workpiece before the power pressing that takes place using the supply unit (see hereinabove).

The radial press illustrated in FIGS. 5 to 10 is characterized—regardless of the use of carbon fiber ring 52—by a multiplicity of design features and other special structural features, which merely taken alone are not inferred in obvious manner from the prior art, and certainly are not in their functional interaction and their combination with one another, and so inventive content exists regardless of the use of carbon fiber ring 52. This is the case specifically for the construction of a core structure, disposed inside a tension ring (consisting of any suitable material), comprising individual segments joined together as a ring, for the individual drive of the press jaws by means of individual slave cylinders associated with the individual press jaws, preferably provided in pairs and charged individually, in groups or all together, for synchronous pressurization of the slave cylinders from an annular common supply unit, preferably extending around the press axis, for the integration of pressure transformation in a supply unit supplying several slave cylinders by mechanical coupling of a multiplicity of master cylinders with a main cylinder, etc. The Applicant reserves the right to claim protection, by way of divisional applications, for radial presses that are characterized by one or more of the foregoing features combined with one another or by other features that may be inferred from the present disclosure, without providing, radially outside the press jaws, at least one fiber structure that surrounds them by extending in annularly closed form around the press axis in a plane oriented substantially perpendicular to the press axis.

Figure 11:
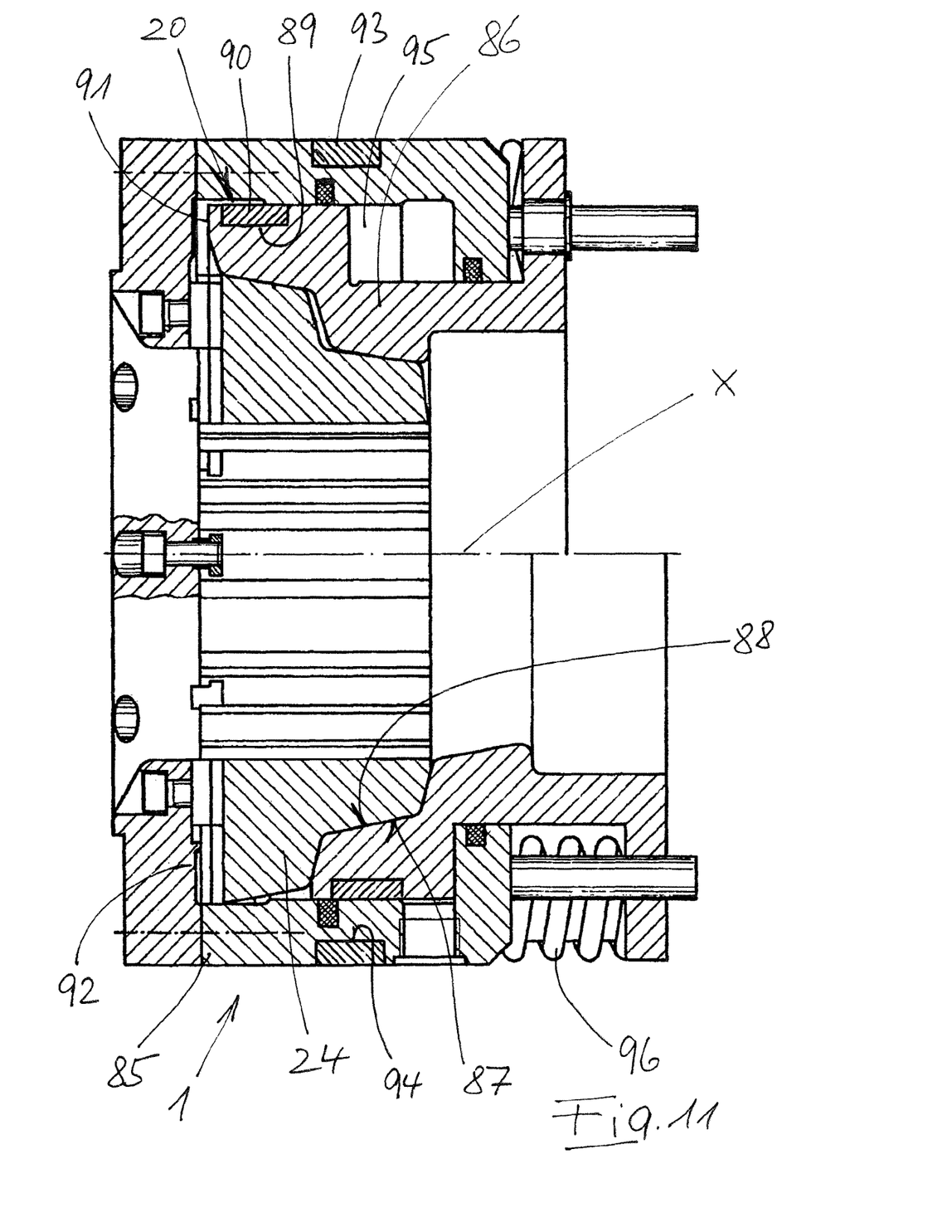
FIG. 11 shows an axial section of a fourth exemplary embodiment of a radial press with opened die.

The fourth exemplary embodiment, illustrated in FIG. 11 of the drawing, relates to a radial press having the type of construction and principle of operation known from and described in detail in DE 2844475 A1 (in connection with FIG. 1 therein). Basic structure 1 is constructed here in the form of a housing 85. And the drive unit comprises a compression ring 86, which can be displaced parallel to press axis X and is provided with second control faces 88 interacting with first control faces 87 of press jaws 24. In this radial press, the contents of this disclosure are implemented on the one hand by the fact that compression ring 86 is constructed in composite design, wherein it is provided with a first carbon ring 90 forming the fiber structure 20 embedded in a corresponding receiving groove 89. This is disposed adjacent to that end face 91 of press ring 86 which is adjacent to abutment 92, on which press jaws 24 are braced while being guided in radially displaceable manner. There the radial wall thickness of compression ring 86 decreases by design, and so the strength-increasing action of first carbon fiber ring 90 becomes particularly effective here.

On the other hand, a further carbon fiber ring 93, again embedded in a corresponding circumferential receiving groove 94, is provided on the outer circumference of housing 85, specifically radially outside cylindrical chamber 95. There considerable forces and stresses, which can be absorbed particularly effectively by means of second carbon fiber ring 93, act when cylindrical chamber 95 is pressurized with high fluid pressure.

In the implementation of the radial press described in the foregoing in connection with FIG. 11, radial presses of this basic design can be configured particularly compactly, i.e. especially with outside dimensions reduced compared with the prior art; or radial presses with dimensions such as known from the prior art can be operated with higher pressures without danger for their function, and so correspondingly higher forming forces are available than in radial presses of the same size according to the prior art.

Incidentally, this is the case independently of whether opening of the press takes place via mechanical retracting springs 96, as illustrated in the exemplary embodiment, or else via a retracting cylinder. And the invention can also be applied in corresponding manner even to radial presses based on the same functional principle, which in this respect are similar but nevertheless differ in terms of the constructive design of compression ring 86 and of housing 85 from DE 2844475 A1 (see, for example, EP 1302255 B1).

What is claimed is:

1. A radial press comprising:
   a basic structure (1),
   a multiplicity of press jaws (24) disposed around a press axis (X) and
   a drive unit, which acts on the multiplicity of press jaws, is braced on the basic structure (1) and by means of which the press jaws (24) can be moved radially toward and away from the press axis (X),
   wherein radially outside the press jaws (24), at least one first fiber structure (20) that surrounds them by extending in annularly closed form around the press axis is provided in a plane oriented substantially perpendicular to the press axis (X), wherein the at least one first fiber structure (20) is part of the drive unit,
   wherein the radial press is constructed as a compression-ring or hollow piston press with a housing (85), which forms the basic structure (1) and in which a compression ring (86) or hollow piston containing the at least one first fiber structure (20) can be displaced parallel to the press axis (X), and
   wherein the radial press further comprises a second fiber structure provided at an outer circumference of the housing, the second fiber structure radially outside of the first fiber structure.

2. The radial press of claim 1, wherein several first fiber structures (20) disposed in a manner offset from one another in the direction of the press axis (X) are provided.

3. The radial press of claim 1, wherein the at least one first fiber structure (20) is part of a closed basic structure (1), wherein it bears circumferentially on a core structure (54), in which the press jaws (24) are mounted movably.

* * * * *